(12) United States Patent
Nauka et al.

(10) Patent No.: US 11,766,826 B2
(45) Date of Patent: Sep. 26, 2023

(54) REDUCING STRESSES IN METAL LAYERS

(71) Applicant: HEWLETT-PACKARD DEVELOPMENT COMPANY, L.P., Houston, TX (US)

(72) Inventors: Krzysztof Nauka, Polo Alto, CA (US); Chris Paul Schodin, San Diego, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 1063 days.

(21) Appl. No.: 16/075,670

(22) PCT Filed: Apr. 5, 2017

(86) PCT No.: PCT/US2017/026054
§ 371 (c)(1),
(2) Date: Aug. 6, 2018

(87) PCT Pub. No.: WO2018/186845
PCT Pub. Date: Oct. 11, 2018

(65) Prior Publication Data
US 2021/0197453 A1 Jul. 1, 2021

(51) Int. Cl.
*B29C 67/00* (2017.01)
*B29C 64/165* (2017.01)
(Continued)

(52) U.S. Cl.
CPC ............ *B29C 64/165* (2017.08); *B22F 10/16* (2021.01); *B22F 10/28* (2021.01); *B22F 12/60* (2021.01);
(Continued)

(58) Field of Classification Search
CPC ... B29C 64/165; B29C 64/209; B29C 64/245; B22F 10/10; B22F 10/20; B33Y 10/00; B33Y 70/10
See application file for complete search history.

(56) References Cited

U.S. PATENT DOCUMENTS 9,017,589 B2    4/2015  Kritchman
2001/0015238 A1*  8/2001  Gaylo ................... B33Y 30/00
                                                141/250
(Continued)

FOREIGN PATENT DOCUMENTS

WO        2015170330 A1    11/2015

OTHER PUBLICATIONS

Saphronov et al., "Experimental and Theoretical Study of Residual Deformations and Stresses at Additive Manufacturing by Fusion", Retrieve from internet—https://www.wlt.de/lim/Proceedings/Stick/PDF/Contribution225_final.pdf, 2015, 5 Pages.

*Primary Examiner* — Ryan M Ochylski
(74) *Attorney, Agent, or Firm* — SHOOK, HARDY & BACON L.L.P.

(57) ABSTRACT

A system may include a printhead for ejecting a first fluid including a polymer, the ejected first fluid forming a substrate with a thermal conductivity of less than 0.5 W/(m-K); a spreader to spread a layer of metal particulate on the substrate, wherein the printhead further ejects a second fluid, the ejected second fluid masking a portion of the layer of metal particulate on the substrate; and a pulse irradiation light source to fuse an unmasked portion of the layer of metal particulate.

13 Claims, 3 Drawing Sheets

(51) Int. Cl.
- *B33Y 10/00* (2015.01)
- *B29C 64/245* (2017.01)
- *B29C 64/209* (2017.01)
- *B29C 64/273* (2017.01)
- *B33Y 70/10* (2020.01)
- *B33Y 70/00* (2020.01)
- *B22F 10/16* (2021.01)
- *B22F 10/28* (2021.01)
- *B22F 12/60* (2021.01)
- *B22F 10/14* (2021.01)

(52) U.S. Cl.
CPC .......... *B29C 64/209* (2017.08); *B29C 64/245* (2017.08); *B29C 64/273* (2017.08); *B33Y 10/00* (2014.12); *B33Y 70/00* (2014.12); *B33Y 70/10* (2020.01); *B22F 10/14* (2021.01)

(56) References Cited

U.S. PATENT DOCUMENTS

| | | |
|---|---|---|
| 2001/0050031 A1 | 12/2001 | Bredt et al. |
| 2002/0045012 A1 | 4/2002 | Hirano et al. |
| 2005/0014005 A1 | 1/2005 | Kramer et al. |
| 2006/0159869 A1 | 7/2006 | Kramer et al. |
| 2014/0193649 A1 | 7/2014 | Perrier-Cornet et al. |
| 2015/0352794 A1* | 12/2015 | Nguyen ................ B29C 64/393 700/98 |
| 2017/0173696 A1* | 6/2017 | Sheinman .............. B33Y 10/00 |
| 2018/0065186 A1* | 3/2018 | Cullinan ................ B22F 12/53 |

* cited by examiner

REDUCING STRESSES IN METAL LAYERS

BACKGROUND

Forming small metal components has traditionally been the domain of machining, with casting and other technologies, e.g., liquid injection molding (LIM) providing other options. Metals provide desirable properties including: mechanical strength, resistance to creep, conductivity, tunable coldwork, etc. While machining has long been the domain of technical specialists, the rise of Computer Numerical Control (CNC) and automated machining has allowed fewer skilled machinists to support an increasing number of machines producing parts. Nevertheless, producing small runs of customized metal parts continues to be a high touch operation with a corresponding high cost.

BRIEF DESCRIPTION OF THE DRAWINGS

The accompanying drawings illustrate various examples of the principles described herein and are a part of the specification. The illustrated examples do not limit the scope of the claims.

Figure 1:
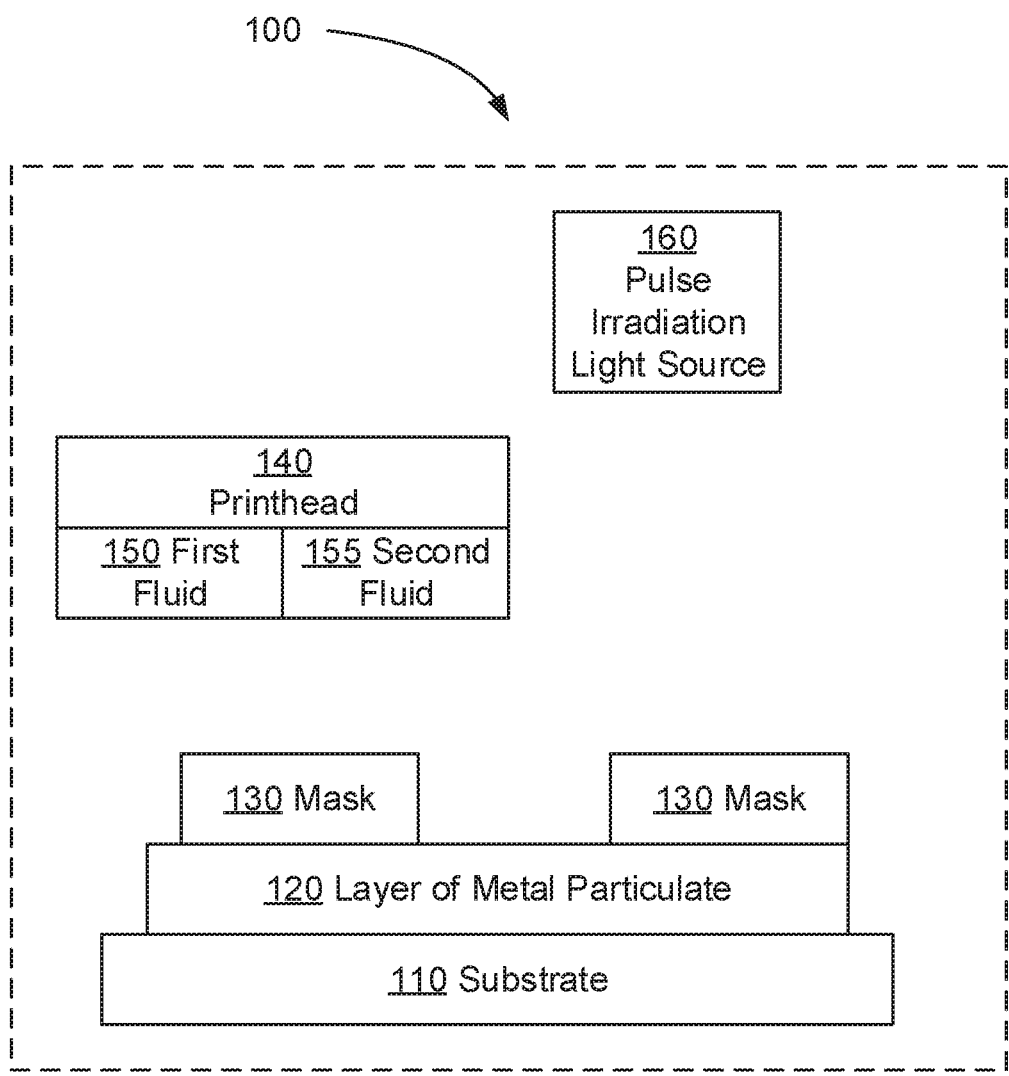
FIG. 1 is a block diagram of a system according to an example consistent with the present specification.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Forming metal components has long been the domain of machining and casting. The development of three-dimensional printing of objects allows the "printing" of polymer components that may be lost wax cast to form metal parts. However, printed polymer components still lack some of the desirable properties of metals, especially creep resistance, conductivity, and ductility. The present specification describes, among other subject matter, a method of three dimensional forming a metal component.

By way of example, a layer of metal particulate is formed on a surface. A mask is selectively applied to the layer of metal particulate. The mask decreases absorption of radiation from a pulse irradiation source. The pulse irradiation light source provides radiation that is converted to heat in the layer of metal particulate: the unmasked portions of the layer melt and consolidate, while the masked portions of the layer do not absorb as much heat and remain particulate. The layer cools and the melted portion of the layer solidifies into a solid metal. Another layer of particulates is formed on top of the previous layer and another mask is applied. The process is repeated, building up a metal object layer by layer until the desired thickness is achieved. The object is then removed from the forming bed. In some cases, additional processes may then be applied to the object, for example: buffing, shot peening, sandblasting, vibratory finishing, electro polishing, coating, annealing, mechanical cold working, etc. Additional processes may also include traditional machining operations.

The use of a pulse irradiation light source that treats the entire metal layer simultaneously provides an advantage in throughput. A pulse irradiation light source may be used in this manner. Unlike, for example, using a laser to raster over the part, which is impacted by the pulse rate and pulse size of the laser, applying a large heating effect allows the target areas of the layer to be melted simultaneously. As throughput is a notable driver for the cost effectiveness of forming methods, the use of a flood type heating increases throughput and reduces time to form a part. Lasers and similar local heating also have the challenge of creating local stress and heat affected zones during heating and cooling.

When the melted consolidated metal solidifies, cracking and bending have been observed. The melted areas are in contact with the adjacent metal particulate laterally, with the substrate below, and with gas, e.g. air, above. The dissipation of the heat from the melted part is dependent on the thermal conductivity of the adjacent materials as well as the thermal temperature difference. The cooling rate and the order in which various portions of the melted metal solidify are a function of the shape and the relative thermal conductivity of the substrate, gas, and metal particulate.

Metals generally have relatively high thermal conductivities, due in part to the ability of electrons to move through the metal atom lattice. Even when accounting for the reduced contact area between metal particles, relatively high thermal conductivity may be observed. However, the thermal conductivity for the metal particle layer may be less than 10% and perhaps as low as 1% of the thermal conductivity of the consolidated metal. Instead of electron migration providing most of the thermal transfer, other mechanisms including radiation transfer appear to be responsible for energy transfer. The result is that the lateral heat transfer appears to be lower than heat transfer into the substrate for metal and/or quartz substrates. This appears to produce the cracking and bending of the initial metal layer(s) and inhibits part formation.

The present specification describes the use of a substrate with a thermal conductivity closer to the thermal conductivity of the metal particle layer in order to produce parts without the warpage and cracking described herein. The use of a substrate that softens/melts slightly under the application of heat also tacks down the initial metal layer thereby reducing warping of the metal part. As a printhead is used to provide the mask layer, the addition of a second printing fluid containing a latex allows deposition of a suitable polymer substrate with the desired thermal conductivity and softening/tackiness to secure the metal part without adding additional mechanisms (other than those to expand from a single fluid printhead to multiple fluid printhead).

The use of a substrate with an appropriate thermal conductivity reduces the instances of cracking and warping in the initial metal layer of a three dimensional printed metal part. Once several layers are built up, the issues of warping go away as the metal part supports the new layers and resists warping. The use of a polymer layer as the substrate, where the polymer layer softens and/or becomes "tacky" when heated as part of the consolidation process, also helps hold the initial metal layer in place and prevent warping. Controlling and/or preventing warping of the developing part facilitates automation, especially the process of forming the layers of metal particulate and not leaving gaps and/or cracks in the formed part.

Among other examples, the present specification describes a system including: a printhead for ejecting a first fluid including a polymer, the ejected first fluid forming a substrate with a thermal conductivity of less than 0.5 W/(m-K); a spreader to spread a layer of metal particulate on the substrate, wherein the printhead further ejects a second fluid, the ejected second fluid masking a portion of the layer of metal particulate on the substrate; and a pulse irradiation light source to fuse an unmasked portion of the layer of metal particulate.

Among other examples, this specification also describes a method of forming a metal object, the method including: applying a layer of latex to a plate, the latex having a lower thermal conductivity than the plate; spreading a layer of metal particles over the layer of latex; masking a portion of the layer of metal particles; and melting an unmasked portion of the layer of metal particles using a pulse irradiation light source.

This specification also describes a method of forming a metal object, the method including: forming a mixed layer of latex and metal particulate; and forming successive layers of consolidated metal particulate on top of the mixed layer.

Turning now to the figures, FIG. 1 shows a system (100) according to one example consistent with the present specification. The system (100) includes: a printhead (140) for ejecting a first fluid (150) including a polymer, the ejected first fluid (150) forming a substrate (110) with a thermal conductivity of less than 0.5 W/(m-K); a spreader (170) to form a layer of metal particulate (120) on the substrate (110), wherein the printhead (140) further ejects a second fluid (155), the ejected second fluid forming a mask (130) on a portion of the layer of metal particulate (120) on the substrate (110); and a pulse irradiation light source (160) to fuse an unmasked portion of the layer of metal particulate (120).

The system (100) is a system for forming a metal article. The system (100) forms the metal article layer by layer. A layer of metal particulate (120) is formed by the spreader (170). The printhead (140) then deposits the second fluid (155) on a portion of the layer of metal particulate (120). The deposited second fluid (155) forms a mask (130). The mask (130) reduces the absorption of heat from the pulse irradiation light source (160) by the portions of the layer of metal particulate (120) covered by the mask (130). So, when the pulse irradiation light source (160) irradiates the layer of metal particulates (120), the unmasked portions melt, consolidate, and cool to form a solid metal layer and the masked portions do not melt. This process is then repeated, layer by layer, until the metal article is finished forming. The metal article is then separated from the metal particulate. The metal particulate may be reused.

The system (100) creates a substrate (110) prior to forming the first layer of metal particulate (120). The substrate (110) is formed by depositing a first fluid (150) using the printhead (140). The substrate (110) has a thermal conductivity no greater than 1.0 W/(m-K). The substrate (110) may be a single layer. The substrate (110) may include multiple layers. The substrate (110) includes a polymer. In one example, the substrate (110) includes a latex that is deposited and crosslinked to form the substrate (110). A latex is a colloidal dispersion of polymer particles in a liquid.

In one example, the substrate (110) formed from the ejected first fluid (150) has a thermal conductivity of less than 0.3 W/(m-K). The substrate (110) formed from the ejected first fluid (150) may have a thermal conductivity of less than 0.1 W/(m-K). The substrate (110) may include additional materials to modify the thermal conductivity. For example, the substrate (110) may include a thermally insulating material selected from: a nanofiber, an aerated gel, polymer beads, polymer fibers, glass filaments, ceramic particles, nanoparticle polymer powder, and combinations thereof. The substrate (110) may include a thermally conductive material selected from: metal particulate, metalize polymer fibers, particulate, and combinations thereof.

The substrate (110) may include a thermoplastic and/or a thermoset plastic. The substrate (110) may be polymerized before, during, and/or after deposition of the first solution (150). Some example thermoplastics include: high density polyethylene (HDPE), poly-methyl-methacrylate (PMMA, acrylic), acrylonitrile butadiene styrene (ABS), polyamides (nylons), polylactic acid (PLA), polyglycolic acid (PGA), polypropylene (PP), polystyrene (PS), and/or polyvinylchloride (PVC). Exemplary thermoset polymers include: epoxies, acrylics, polyesters, polyurethanes, polyphenols, and polyamino resins. The substrate (110) may be formulated such that a first thermal conductivity through the substrate is equal to a second thermal conductivity through the layer of metal particulate (120). The first thermal conductivity may be 80% to 120% of the second thermal conductivity. The first thermal conductivity may be 50% to 200% of the second thermal conductivity.

The layer of metal particulate (120) is formed by the spreader (170). The layer of metal particulate (120) may include a single material. The layer of metal particulate (120) may include multiple types of materials. In one example, the multiple types of materials are patterned in the layer in a manner corresponding to the shape of the object being formed. The layer of metal (120) particulate may be a fixed depth. The layer of metal particulate (120) may be of non-uniform depth. The layer of metal particulate (120) may be sloped from one side to the other. A top surface of the layer of metal particulate (120) may be flat and/or parallel to the ground. In one example, the distance between the printhead (140) and the top surface of the layer of metal particulate (120) is uniform across the working area of the layer of metal particulate (120), where the working area is the area that used to produce the consolidated metal part.

The mask (130) is formed by selectively depositing the second fluid (155) onto the layer of metal particulate (120) using the printhead (140). The mask (130) reduces absorption from the pulse irradiation light source (160) so that the masked areas do not melt while the unmasked areas of the layer of metal particulate melt. This selective melting allows for the patterning and shaping of the component during the layer by layer assembly of the metal part.

The mask (130) may include a variety of materials. In one example, the mask is soluble in a solution while the metal particles are not soluble in the solution. For example, the mask may be water soluble and a water rinse is used as part of reprocessing the metal particles. The mask may be alcohol soluble and an alcohol rinse used in reprocessing the metal particles.

The mask (130) may use a pigment to reduce absorption of radiation from the pulse irradiation light source (160). In one example, the mask (130) contains titanium dioxide to reduce absorption of energy from the pulse irradiation light source (160). The mask (130) may contain other white pigments, for example: antimony white ($Sb_2O_3$), lithopone, zinc sulfide, zinc oxide, barium sulfate, white leads and/or combinations thereof. The mask (130) may include metalized particles which reduce absorption. The mask (130) may include aluminum, silver, and/or other metal coated particles.

The printhead (140) may include a reservoir for the first fluid (150) and a reservoir for the second fluid (155). The printhead (140) may receive the fluids (150, 155) in an on-demand basis, for example, from a supply line. The printhead includes jets for ejecting the first fluid (150) and the second fluid (155). In one example, the jets are thermal ink jets (TIJ). The jets may be piezoelectric ink jets (PIJ).

The jets of the printhead may all be similar in size and properties. The jets for ejecting the first fluid (150) may be a first size and the jets for ejecting the second fluid (155) may be a second size. The jets for the second fluid (155) may include multiple sizes. For example, the printhead (140) may include a larger size jet for covering large areas of the layer of metal particles (120) to be covered with the mask (130) and the printhead (140) may also include a smaller size jet for outlining the boundary at the edge of the mask (130). In one example, the material for the mask (130) is applied uniformly on all masked areas. The material may be applied non-uniformly, for example, the boundaries of the masked areas may be given a higher and/or lower density of masking material.

In one example, the printhead (140) makes multiple passes when applying the mask (130). The printhead (140) may apply the mask (130) in a single pass. The pulse irradiation light source (160) may be integrated into the printhead. In one example, the pulse irradiation light source (160) is traversed laterally while heating the unmasked layer of metal particulate (120). The optimum mask application parameters, density of masking components, and heating cycle(s) may vary somewhat depending on the dimensions of the system, the particulate composition and size, and the mask used.

The first fluid (150) contains a polymer and/or a polymer precursor. In one example, the first fluid (150) contains a latex. The first fluid (150) may contain an epoxy and/or other reactive monomer and/or oligomer. The first fluid (150) may include a silicone oil. The first fluid (150) may contain a polymer with an amorphous phase and a crystalline phase. For example, a block polymer may contain polyether segments and polystyrene segments where the poly styrene segments for crystalline domains in the material.

In some examples, the first fluid includes a colorant to make visualization of the layer easy and/or determine when the layer has been removed. The colorant may be a dye and/or a pigment. The first fluid (150) may include two fluids, both containing compatible polymers but having different colorants. The two fluids may be used to include labeling information and/or other information as part of the printed substrate (110). Similarly, the two fluids may be used to label the formed metal part after the metal part is completed but before removing the meal part from the bed.

In another example, the second fluid (155) is used to apply a pattern to the formed metal part. The pattern is then coated with a clear first fluid (150) to protect the pattern from damage.

The second fluid (155) contains the masking agent. Suitable masking agents are discussed above. Depending on the jet used, the second fluid may include a solvent and/or a humectant. Solvents and/or humectants may include water, low molecular weight alcohols ($C_4$ and smaller), and/or low molecular weight polyols, etc. In one example, water is the solvent.

The pulse irradiation light source (160) provides energy to melt and/or sinter unmasked portions of the layer of metal particles (120) together while not melting and/or sintering the masked portions of the layer of metal particles (120). The pulse irradiation light source (160) may be static. The pulse irradiation light source (160) may move, for example, the pulse irradiation light source (160) may move from one side of the bed to the other side of the bed. The energy output from the pulse irradiation light source (160) may be pulsed and/or steady state. The energy output from the pulse irradiation light source (160) may be uniform across the layer of metal particulate (120). In other examples, the energy output is non uniform across the layer of metal particulate (120). The position of the pulse irradiation light source (160) relative to the layer of metal particulate (120) may be adjusted based on the non uniformity of the output and a shape of the unmasked portions of the layer of unmasked particulate (120). Similarly, the exposure time and/or energy level of the pulse irradiation light source (160) may be adjusted between layers depending on the size, shape, and location of the unmasked portions of the layer of metal particulate (120). The exposure time and/or energy level of the pulse irradiation light source (160) may be adjusted between the first layers, the first few layers, and/or layers after a substantial number of layers have been processed, e.g. eight layers.

The pulse irradiation light source (160) may provide radiation, the radiation being preferentially absorbed to create heat in the unmasked portions of the layer of metal particulate (120). The pulse irradiation light source (160) may be used to modify the properties of the substrate (110). In one example, the pulse irradiation light source (160) may be used to drive off water and/or promote chemical reactions such as crosslinking in the substrate (110). The pulse irradiation light source (160) may be used to soften and/or melt the substrate to increase the adhesion of metal particulate and/or the consolidated metal part.

The pulse irradiation light source (160) may emit radiation primarily in the visible, ultraviolet (UR), and/or near-infrared (near-IR) range. The pulse irradiation light source (160) may be a gas discharge lamp. Such lamps produce a wide range emission spectrum. The pulse irradiation light source (160) may be a monochromatic source, such as a laser and/or light emitting diode (LED), or an assembly of lasers and/or LEDs capable of producing a flood-like irradiation of the target surface. The pulse irradiation light source (160) may have an exposure time of less than 1 millisecond (ms). The exposure time of the pulse irradiation light source (160) may range between 10 s of microseconds (µs) and 100 s of ms, depending on the particular pulse irradiation light source (160) used, the mask (130) material, the geometry of the bed, the thickness of layer of metal particulate (120), the composition and size of the metal particulate, the ratio of masked to unmasked portions of the layer of metal particulate (120), and/or other factors.

The spreader (170) forms a layer of metal particulate (120) on the substrate and on previous layers once the unmasked portions have been consolidated. The spreader (170) may include a leveling blade. The spreader (170) may include a feed for additional particulate to form the layer of metal particulate (120). The spreader (170) may include a vibrating component to distribute and/or compact the layer of metal particulate (120). The spreader (170) may make a single pass to form the layer of metal particulate (120). The spreader may make multiple passes to form the layer of metal particulate (120). In one example, the subsequent passes increase the density of the layer of metal particulate (120). The spreader (170) may be automatic. The spreader (170) may be semi-automatic. The spreader (170) may be manually operated by a user.

The spreader (170) may form layers of metal particulate (120) that are of a uniform depth. The spreader may vary the depth of the formed layer of metal particulate (120) as a function of location in the metal part, location in the bed, and/or feature resolution. In one example, the spreader (170) uses a first thickness for the initial layer and/or the initial few layers and then changes to a second thickness for the remainder of the part.

Figure 2:
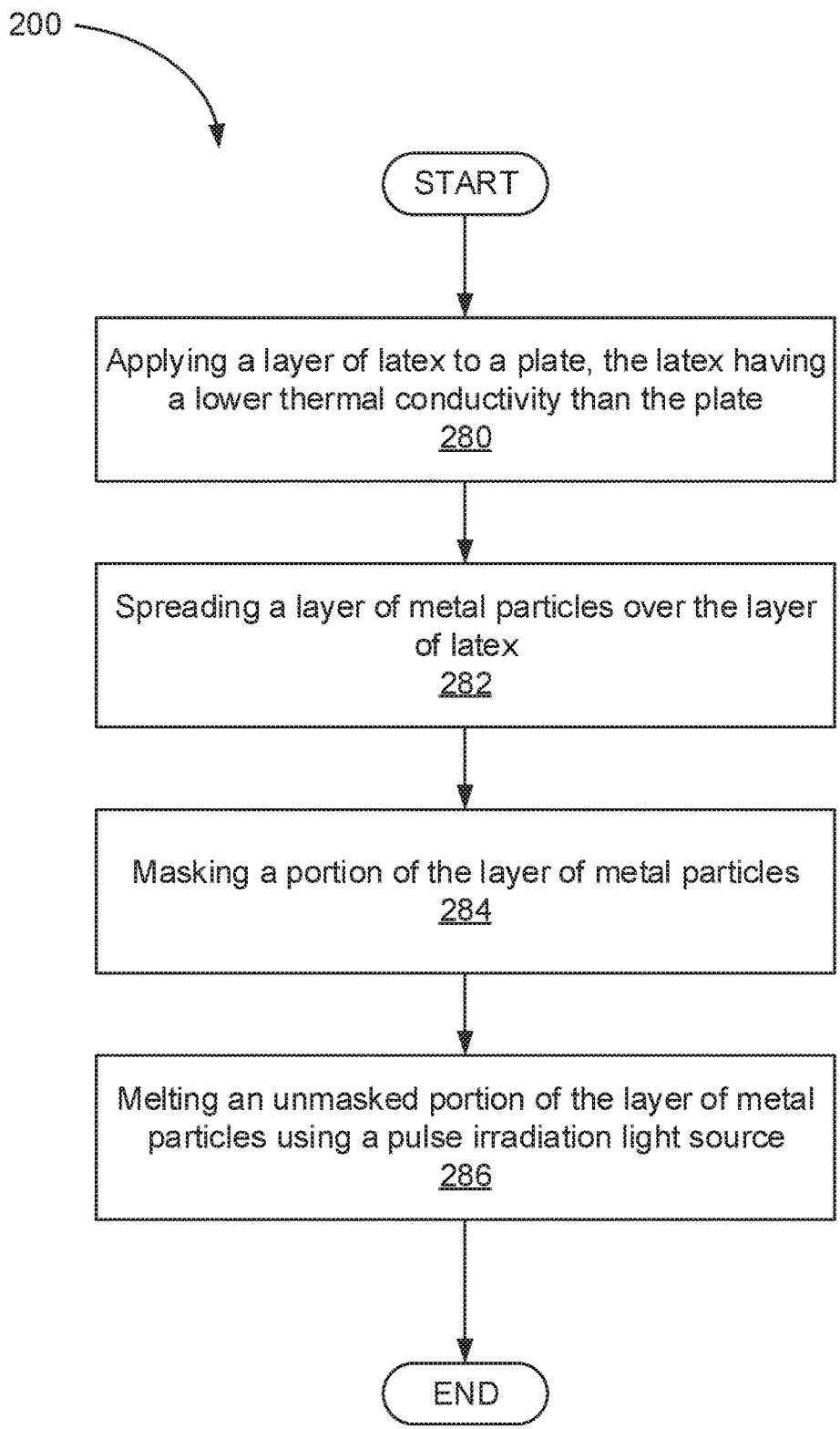
FIG. 2 shows a flow chart for a method of forming a metal object consistent with the present disclosure.

FIG. 2 shows a flow chart for a method (200) of forming a metal object consistent with the present disclosure. The method (200) is a method (200) of forming a metal object. The method (200) includes: applying a layer of latex to a plate, the latex having a lower thermal conductivity than the plate (280); spreading a layer of metal particles (120) over the layer of latex (282); masking a portion of the layer of metal particles (284); and melting an unmasked portion of the layer of metal particles using a pulse irradiation light source (286).

The method (200) is a method (200) of forming a metal object. The method (200) includes applying a layer of latex to a plate, the latex having a lower thermal conductivity than the plate (280). The layer of latex may be applied using a printhead. The layer of latex may be applied by spreading the layer onto the plate and then curing the latex. The layer of latex may be formed and then applied to the plate. The layer of latex may include numbers, letters, patterns, etc. to convey information about the associated metal object. For example, the layer of latex may include the serial number of the metal object.

The method (200) includes spreading a layer of metal particles (120) over the layer of latex (282). The layer of latex may be heated to soften and/or melt the layer of latex before spreading the layer of metal particles (120). The layer of metal particles (120) may be spread by hand. The layer of metal particles (120) may be spread by a machine. The layer of metal particles (120) may include multiple materials. The layer of metal particles (120) may include metal particles of multiple size distributions.

Spreading a layer of metal particles (120) may further include compacting the layer of metal particles (120). Spreading the layer of metal particles (120) may include making multiple passes from multiple directions to achieve a more uniform layer of metal particles (120). Spreading the layer of meal particles (120) may include patterning the metal particles depending on the planned masked and unmasked areas.

The method (200) includes masking a portion of the layer of metal particles (120) (284). The masking may be performed by applying a mask with a printhead (140). The masking may be accomplished by placing a template between a pulse irradiation light source (160) and the layer of metal particles (120). The mask (130) may be preformed and applied to the layer of metal particles (120) as a sheet of material. The mask (130) may be designed to evaporate and/or sublimate away after exposure to a pulse irradiation light source (160). In one example, the mask (130) material functions as an ablative protection and the heat application to melt the unmasked portions of the layer of metal particle (120) removes most of the mask (130), for example, by sublimation.

The method (200) includes melting an unmasked portion of the layer of metal particles using a pulse irradiation light source (286). The use of a pulse irradiation light source (160) allows the metal particulate to be melted in a relatively short time frame. A pulse irradiation light source (160) may also allow heating of the whole unmasked portion of the layer of metal particles (120) simultaneously, reducing the time to form a layer and the total time to form the metal object. In some example, the pulse irradiation light source (160) may apply multiple pulses. The pulse irradiation light source (160) may use a fixed pulse, i.e. fixed energy and fixed time. The pulse irradiation light source (260) may use a variable pulse where the energy and/or pulse length is varied depending on inputs.

Figure 3:
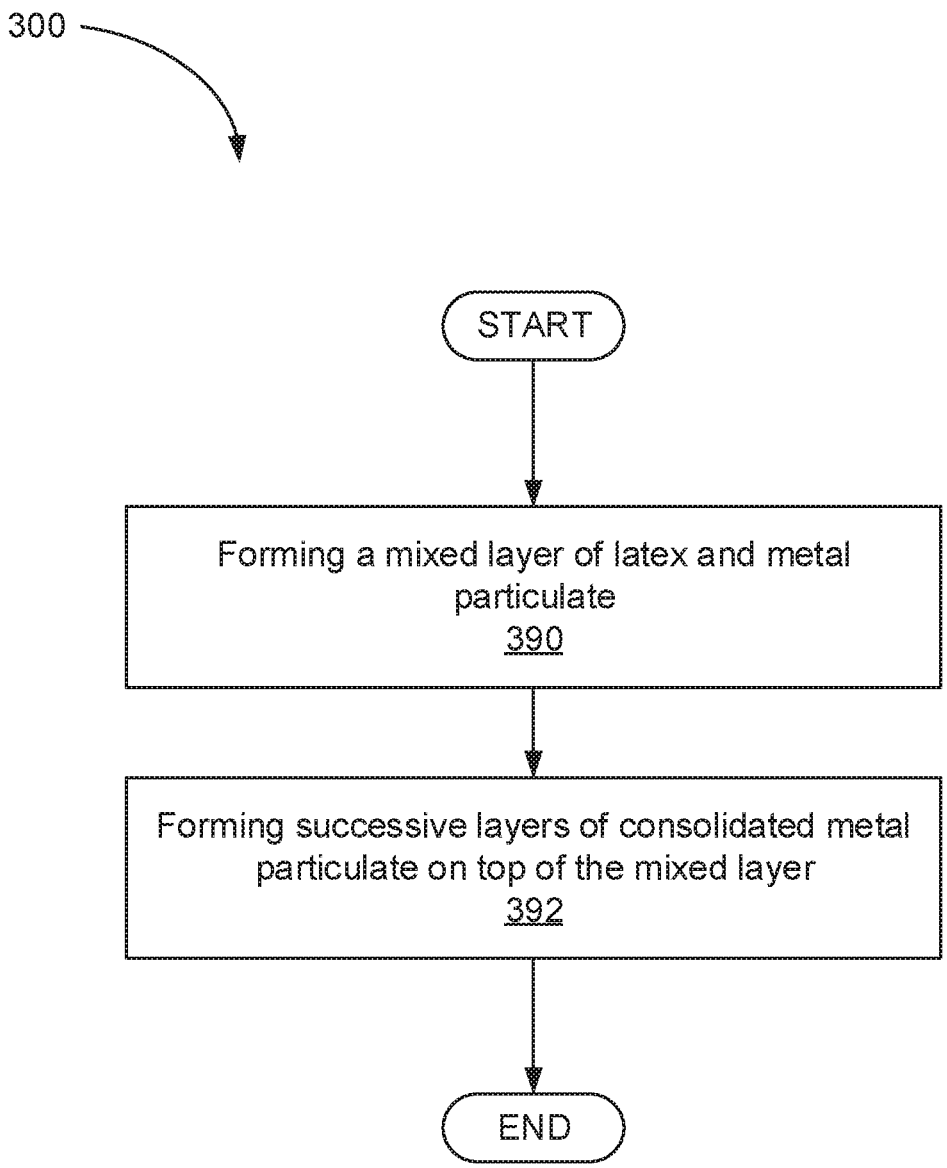
FIG. 3 shows a flow chart for a method of forming a metal object consistent with the present disclosure.

FIG. 3 shows a flow chart for a method (300) of forming a metal object consistent with the present disclosure. The method (300) is a method (300) of forming a metal object. The method (300) includes: forming a mixed layer of latex and metal particulate (390); and forming successive layers of consolidated metal particulate on top of the mixed layer (392).

The method (300) is a method (300) of forming a metal object. More specifically, the method (300) is a method (300) of reducing cracking and warping in the initial layers of a metal object being formed using layer-by-layer construction.

The method (300) includes forming a mixed layer of latex and metal particulate (390). This mixed layer may include multiple layers of latex. The use of a polymer base provides two advantages to reduce cracking and warping. First, the base has a lower heat transfer coefficient so that the transfer of heat laterally to the other metal particulate and the transfer down into the base are closer. This reduces non-uniformities that may induce cracking and/or warping. The base also acts to tack the metal layer in place, providing mechanical resistance to warping and/or cracking. This tackiness is especially useful for the first layer(s) of the developing structure.

The method (300) also includes forming successive layers of consolidated metal particulate on top of the mixed layer (392). Once the base is in place, additional metal layers may be built up. The mixed layer still provides the insulation and the accumulating layers providing increasing mechanical strength to resist deformation and warping.

In some examples, a first set of processing conditions is used for the first layer(s) of the metal object and a second, higher energy set of processing conditions is used for layers once a solid base in in place. The energy density used to consolidate the mixed layer may be less than the energy density used to consolidate the successive layers. The strength of the previous layers may stabilize the form against warping. The previous layers may reduce the thermal shocks of heating and/or cooling.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of forming a metal object, the method comprising:
    forming a polymer substrate on which the metal object is be formed by applying a layer of latex to a plate, the latex having a lower thermal conductivity than the plate;
    forming a pattern in the layer of latex, wherein the pattern is to convey information about the metal object;
    spreading a layer of metal particles over the polymer substrate, wherein a thermal conductivity through the polymer substrate is within a 20% range of a thermal conductivity through the layer of metal particles;
    masking a portion of the layer of metal particles; and
    melting an unmasked portion of the layer of metal particles using a pulse light source.

2. The method of claim 1, wherein masking a portion of the layer of metal particles is performed with an inkjet.

3. The method of claim 1, wherein the layer of latex the substrate is performed with an inkjet.

4. The method of claim 1, wherein applying the layer of latex to the substrate is performed by mechanically spreading a layer of a latex containing compound on the substrate.

5. The method claim 1, wherein the polymer substrate is free of metal particles.

6. The method claim 1, further comprising softening the polymer substrate prior to spreading the layer of metal particles over the polymer substrate to hold the layer of metal particles in place.

7. The method claim 1, wherein the substrate further comprises an additional thermally insulating material.

8. The method of claim 1, further comprising labeling the substrate by depositing differently colored latex fluids.

9. The method of claim 1, wherein melting the unmasked portion of the layer comprises treating an entire layer of metal particles simultaneously with the pulsed irradiation light source.

10. The method of claim 1, further comprising masking the portion of the layer of metal particles with a pigmented mask.

11. The method of claim 1, further comprising masking the portion of the layer of metal particles with a mask comprising metalized particles.

12. The method of claim 1, wherein:

forming the polymer substrate is performed with inkjet nozzles having a first size; and masking the portion of the layer of metal particles is performed with inkjet nozzles having a second size.

13. The method of claim 1, wherein melting the unmasked portion of the layer comprises melting the unmasked portion with a non-uniform pulsed irradiation energy output across the layer of metal particles.

* * * * *